US012743260B2

(12) United States Patent
Zhou

(10) Patent No.: US 12,743,260 B2
(45) Date of Patent: Sep. 22, 2026

(54) APPLICATION INSTALLATION METHOD, APPARATUS, AND ELECTRONIC DEVICE

(71) Applicant: HUAWEI TECHNOLOGIES CO., LTD., Shenzhen (CN)

(72) Inventor: Zhongsheng Zhou, Hangzhou (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 18/290,621

(22) PCT Filed: Aug. 10, 2023

(86) PCT No.: PCT/CN2023/112234
§ 371 (c)(1),
(2) Date: Jan. 19, 2024

(87) PCT Pub. No.: WO2024/046080
PCT Pub. Date: Mar. 7, 2024

(65) Prior Publication Data
US 2025/0238214 A1 Jul. 24, 2025

(30) Foreign Application Priority Data
Aug. 29, 2022 (CN) ......................... 202211048518.3

(51) Int. Cl.
*H04L 29/06* (2006.01)
*G06F 8/61* (2018.01)

(52) U.S. Cl.
CPC ...................................... *G06F 8/61* (2013.01)

(58) Field of Classification Search
CPC . G06F 8/61; G06F 21/57; G06F 21/51; G06F 9/445
See application file for complete search history.

(56) References Cited

U.S. PATENT DOCUMENTS

2012/0331307 A1* 12/2012 Fernandez .............. G06F 21/72 713/190
2016/0127367 A1* 5/2016 Jevans .................... G06F 21/64 713/152

(Continued)

FOREIGN PATENT DOCUMENTS

CN 108108612 A 6/2018
CN 113496039 A 10/2021

(Continued)

OTHER PUBLICATIONS

Extended European Search Report in European Appln. No. 23828320.4 mailed on Oct. 17, 2024, 7 pages.

(Continued)

*Primary Examiner* — S. Sough
*Assistant Examiner* — Mohammad H Kabir
(74) *Attorney, Agent, or Firm* — Fish & Richardson P.C.

(57) ABSTRACT

In an example application installation method, a first device receives a first operation of a user, where the first operation is an operation of selecting a first application from a third-party application for downloading. The first device displays a first interface, where the first interface is a risk prompt interface of the first application or a permission setting interface of the first application. The first device receives a second operation performed on the first interface. The first device determines that the second operation is a device operation. The first device displays a second interface, where the second interface is used to prompt the user with an installation risk.

20 Claims, 11 Drawing Sheets

(56) References Cited

U.S. PATENT DOCUMENTS

| | | | | |
|---|---|---|---|---|
| 2020/0259668 | A1* | 8/2020 | Loreskar | G06F 21/44 |
| 2024/0028375 | A1* | 1/2024 | Jigalur | G06F 8/61 |
| 2024/0193306 | A1* | 6/2024 | Pu | G06F 21/629 |

FOREIGN PATENT DOCUMENTS

| | | | | | |
|---|---|---|---|---|---|
| CN | 113641987 | A | * | 11/2021 | G06F 21/51 |
| WO | WO-2016176373 | A1 | * | 11/2016 | G06F 21/6218 |

OTHER PUBLICATIONS

EP Communication Pursuant to Article 94(3) EPC in European Appln. No. 23828320.4, mailed on Jun. 29, 2026, 8 pages.

* cited by examiner

APPLICATION INSTALLATION METHOD, APPARATUS, AND ELECTRONIC DEVICE

CROSS-REFERENCE TO RELATED APPLICATIONS

This application is a national stage of International Application No. PCT/CN2023/112234, filed on Aug. 10, 2023, which claims priority to Chinese Patent Application No. 202211048518.3 filed on Aug. 29, 2022. Both of the aforementioned applications are hereby incorporated by reference in their entireties.

TECHNICAL FIELD

This application relates to the field of electronic devices, and more specifically, to an application installation method, an apparatus, and an electronic device.

BACKGROUND

In a current Android® (Android) system, different developers may customize systems based on respective features, perform corresponding control on security of applications of respective user equipment (user equipment, UE), and authorize an accessibility (accessibility, A11Y) capability for an application that has been approved and that is secure and compliant, to help a user perform a more convenient operation on the application.

However, some third-party applications cannot support a convenient installation function because the applications are not authorized by the system. To increase a distribution proportion of the application or install a virus or Trojan horse without user perception, the applications often perform corresponding function bypass by using an A11Y function, to obtain permission similar to that of an application market authorized by the system, and perform automatic installation on the user equipment, thereby putting the user equipment at risk. In this case, it is easy for an application that has not passed a security review of an application market (an official application market) of a developer to be automatically installed on a mobile phone of a user. This brings a great security risk to a consumer and affects user experience.

Therefore, an application installation method, an apparatus, and an electronic device are urgently needed, so that a subsequent response policy can be determined by identifying a device operation on a current device, to prevent a third-party application from bypassing, through invoking of a system capability, important information prompted to a user, help a system better intercept a risk and provide a risk prompt, and improve user security.

SUMMARY

This application provides an application installation method, an apparatus, and an electronic device, to help better intercept a risk and provide a risk prompt, and improve user security.

According to a first aspect, an application installation method is provided, including: A first device receives a first operation of a user, where the first operation is an operation of selecting a first application from a third-party application for downloading. The first device displays a first interface, where the first interface is a risk prompt interface of the first application or a permission setting interface of the first application. The first device receives a second operation performed on the first interface. The first device determines that the second operation is a device operation. The first device displays a second interface, where the second interface is used to prompt the user with an installation risk. The third-party application may be a third-party application market or a third-party browser. In this application, a third party may be a software provider different from a terminal manufacturer, or may be a software provider the same as a terminal manufacturer.

According to the technical solutions of this application, a subsequent response policy can be determined by identifying a device operation on a current device, to prevent a third-party application from bypassing, through invoking of a system capability, important information prompted to a user, help a system better intercept a risk and provide a risk prompt, and improve user security.

With reference to the first aspect, in some implementations of the first aspect, that the first device determines whether the second operation is a device operation includes: The first device determines, based on a feature of the second operation, that the second operation is a device operation, where the feature of the second operation includes at least one of the following: a response time of the second operation, a pressing parameter of the second operation, or fingerprint information related to the second operation. In this way, the device may identify, based on the feature of the second operation, whether the second operation is a device operation, thereby helping better intercept a risk and provide a risk prompt, and improving user security.

With reference to the first aspect, in some implementations of the first aspect, before the first device receives the first operation of the user, the method further includes: The first device receives a third operation of the user, where the third operation indicates the first device to enable an accessibility mode. The second interface is further used to prompt the user that the first device has enabled the accessibility mode. In this way, after the user enables the accessibility mode under guidance or without being informed, the device may prompt, by using the second interface, the user that the first device has enabled the accessibility mode. This helps better intercept a risk and provide a risk prompt, and improves user security.

With reference to the first aspect, in some implementations of the first aspect, before the first device displays the first interface, the method further includes: The first device determines that the first application is a blacklisted application, a non-whitelisted application, or an application that is not officially certified.

With reference to the first aspect, in some implementations of the first aspect, the permission setting interface of the first application includes at least one of the following: permission to obtain location information of the first device; permission to read storage information of the first device; permission to write storage information of the first device; permission to use a microphone of the first device; permission to use a camera of the first device; or permission to allow the first application to be displayed in a floating window on the first device.

With reference to the first aspect, in some implementations of the first aspect, the method further includes: The first device receives a fourth operation of the user, where the fourth operation is an operation of selecting a second application from the third-party application for downloading. The first device displays a third interface, where the third interface is a risk prompt interface of a third application or a permission setting interface of the third application. The first device receives a fifth operation performed on the third interface. The first device determines that the fifth operation is a manual operation (that is, a non-device operation). The first device continues to install the second application.

According to a second aspect, an application installation apparatus is provided, including an obtaining module, a determining module, and a display module. The obtaining module is configured to receive a first operation of a user, where the first operation is an operation of selecting a first application from a third-party application for downloading. The display module is configured to display a first interface, where the first interface is a risk prompt interface of the first application or a permission setting interface of the first application. The obtaining module is further configured to receive a second operation performed on the first interface. The determining module is configured to determine that the second operation is a device operation. The display module is configured to display a second interface, where the second interface is used to prompt the user with an installation risk.

According to the technical solutions of this application, a subsequent response policy can be determined by identifying a device operation on a current device, to prevent a third-party application from bypassing, through invoking of a system capability, important information prompted to a user, help a system better intercept a risk and provide a risk prompt, and improve user security.

With reference to the second aspect, in some implementations of the second aspect, the determining module is specifically configured to determine, based on a feature of the second operation, that the second operation is a device operation. The feature of the second operation includes at least one of the following: a response time of the second operation, a pressing parameter of the second operation, or fingerprint information related to the second operation.

With reference to the second aspect, in some implementations of the second aspect, before receiving the first operation of the user, the obtaining module is further configured to receive a third operation of the user, where the third operation indicates the first device to enable the accessibility mode. The second interface is further used to prompt the user that the first device has enabled the accessibility mode.

With reference to the second aspect, in some implementations of the second aspect, before the display module displays the first interface, the determining module is further configured to determine that the first application is a blacklisted application, a non-whitelisted application, or an application that is not officially certified.

With reference to the second aspect, in some implementations of the second aspect, the permission setting interface of the first application includes at least one of the following: permission to obtain location information of the first device; permission to read storage information of the first device; permission to write storage information of the first device; permission to use a microphone of the first device; permission to use a camera of the first device; or permission to allow the first application to be displayed in a floating window on the first device.

With reference to the second aspect, in some implementations of the second aspect, the obtaining module is further configured to receive a fourth operation of the user, where the fourth operation is used to request an installation of a second application. The display module is further configured to display a third interface, where the third interface is a risk prompt interface of a third application or a permission setting interface of the third application. The obtaining module is further configured to receive a fifth operation performed on the third interface. The determining module is further configured to determine that the fifth operation is a manual operation (that is, a non-device operation). The display module is further configured to continue to install the second application.

According to a third aspect, an electronic device is provided, including a processor and a memory, where the processor is configured to perform the method according to any one of the implementations of the first aspect.

According to a fourth aspect, a chip is provided. The chip includes a processor and a data interface. The processor reads, through the data interface, instructions stored in a memory, to perform the method according to any one of the implementations of the first aspect.

Optionally, in an implementation, the chip may further include the memory. The memory stores the instructions, the processor is configured to execute the instructions stored in the memory, and when the instructions are executed, the processor is configured to perform the method according to any one of the implementations of the first aspect.

According to a fifth aspect, a computer program storage medium is provided. The computer-readable medium stores program code. When the computer program code is run on a computer, the computer is enabled to execute instructions according to any one of the possible implementations of the first aspect.

According to a sixth aspect, a computer program product including instructions is provided. When the computer program product runs on a computer, the computer is enabled to perform the method according to any one of the implementations of the first aspect.

According to a seventh aspect, a terminal device is provided, including modules configured to perform the method according to any one of the possible implementations of the first aspect.

According to an eighth aspect, a communication apparatus is provided, and is configured to perform the method according to any one of the possible implementations of the first aspect.

According to a ninth aspect, an apparatus is provided. The apparatus includes a processor and a memory. The processor is coupled to the memory, and the memory is configured to store a computer program. The processor is configured to execute the computer program stored in the memory, so that the communication apparatus performs the method according to any one of the possible implementations of the first aspect.

According to a tenth aspect, an apparatus is provided. The apparatus includes a processor, a memory, and a transceiver. The memory is configured to store a computer program. The processor is configured to execute the computer program stored in the memory, so that the apparatus performs the method according to any one of the possible implementations of the first aspect.

According to an eleventh aspect, an apparatus is provided. The communication apparatus includes at least one processor and a communication interface. The communication interface is used by the communication apparatus to exchange information with another communication apparatus. When program instructions are executed by the at least one processor, the communication apparatus is enabled to implement the method according to any one of the possible implementations of the first aspect.

According to a twelfth aspect, a processor is provided. The processor includes at least one circuit, configured to perform the method according to any one of the possible implementations of the first aspect.

According to a thirteenth aspect, a chip system is provided. The chip system includes at least one processor. When program instructions are executed by the at least one processor, the chip system is enabled to implement the method according to any one of the possible implementations of the first aspect.

DESCRIPTION OF EMBODIMENTS

Figure 1:
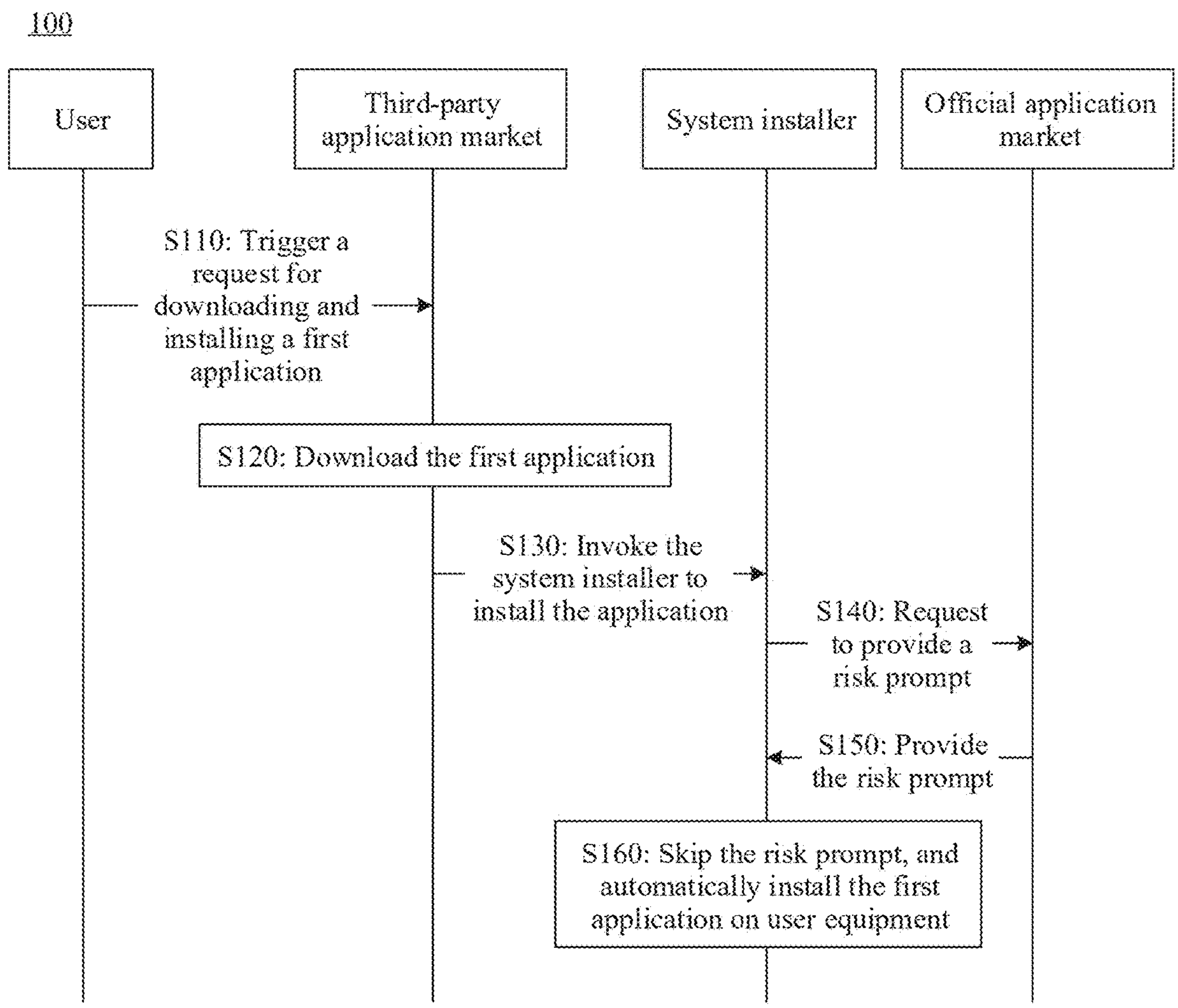
FIG. 1 is a schematic flowchart in which a current third-party application installs another application on user equipment.

The following describes technical solutions of this application with reference to accompanying drawings.

Terms used in the following embodiments are merely intended to describe particular embodiments, but are not intended to limit this application. As used in the specification and appended claims of the application, singular expressions "one", "a", "the", "the foregoing", "this", and "the one" are also intended to include expressions such as "one or more", unless otherwise specified in the context clearly. It should be further understood that in the following embodiments of this application, "at least one" and "one or more" mean one, two, or more. The term "and/or" is used to describe an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this application include a specific feature, structure, or feature described with reference to embodiments. Therefore, expressions such as "in an embodiment", "in some embodiments", "in other embodiments", and "in some other embodiments" that appear at different places in this specification do not necessarily mean reference to a same embodiment. Instead, the expressions mean "one or more but not all of embodiments", unless otherwise specifically emphasized in another manner. The terms "include", "comprise", "have", and variants thereof all mean "include but are not limited to", unless otherwise specifically emphasized in another manner.

In a current Android® (Android) system, different developers may customize systems based on respective features, perform corresponding control on security of applications of respective user equipment (user equipment, UE), and authorize an accessibility (accessibility, A11Y) capability for an application that has been approved and that is secure and compliant, to help a user perform a more convenient operation on the application. Some malicious applications usually obtain document object model (document object model, DOM) tree information of a specified application interface and perform determining and an automatic operation by using an A11Y function. The function that provides convenience support for a user is maliciously used in non-compliant processing, which brings a great security risk to a consumer. For example, some third-party applications cannot support a convenient installation function because the applications are not authorized by the system. To increase a distribution proportion of the application or install a virus or Trojan horse without user perception, the applications often perform corresponding function bypass by using the A11Y function, to obtain permission similar to that of an application market authorized by the system, and perform automatic installation on the user equipment, thereby putting the user equipment at risk. In this case, it is easy for an application that has not passed a security review of an application market (an official application market) of a developer to be automatically installed on a mobile phone of a user, which affects user experience. In addition, a third-party application market may obtain advanced permission of the user equipment and automatically install the application on the user equipment by using the function, to achieve commercial interests and objectives of the third-party application market.

FIG. 1 is a schematic flowchart in which a current third-party application installs another application on user equipment.

S110: A third-party application market triggers a request for downloading and installing a first application.

Figure 2:
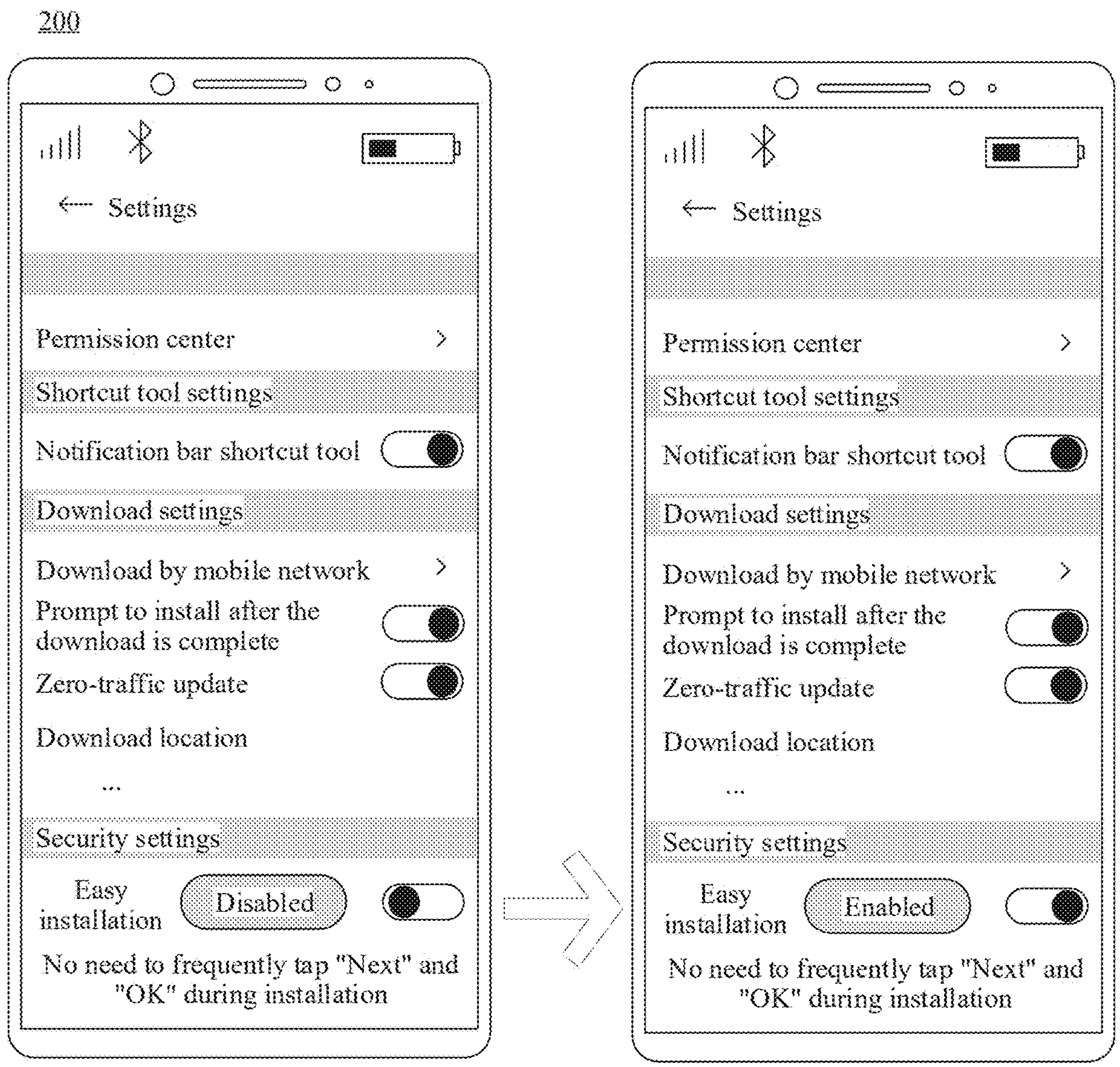
FIG. 2 is a schematic diagram in which a third-party application guides a user to enable an accessibility mode.

Specifically, as shown in FIG. 2, the third-party application market guides a user to enable an accessibility mode (for example, easy installation or a one-tap installation function) of the user equipment, or the user has enabled the accessibility mode. When the user starts the third-party application market on the user equipment that has enabled the accessibility mode, the third-party application triggers a request for downloading and installing a risky application.

It should be understood that, that the third-party application market triggers the request for downloading and installing the first application may be a possible implementation. In an actual application scenario, another application may alternatively trigger the request for downloading and installing the first application. For example, the request for downloading and installing the first application is triggered by using a website address in a browser.

S120: The third-party application market downloads the first application.

The third-party application market may download the first application by using the third-party application market or a download platform of the third-party application market. The first application may also be referred to as a risky application.

S130: The third-party application market invokes a system installer to install the application.

S140: The system installer requests an official application market to provide a risk prompt.

Specifically, the system installer perceives that an untrusted (unauthorized to install another application) application attempts to invoke the system installer to install an unknown application, which poses a corresponding security risk. In this case, the system may request the official application market to provide a risk prompt.

S150: The official application market provides the risk prompt.

Figure 3:
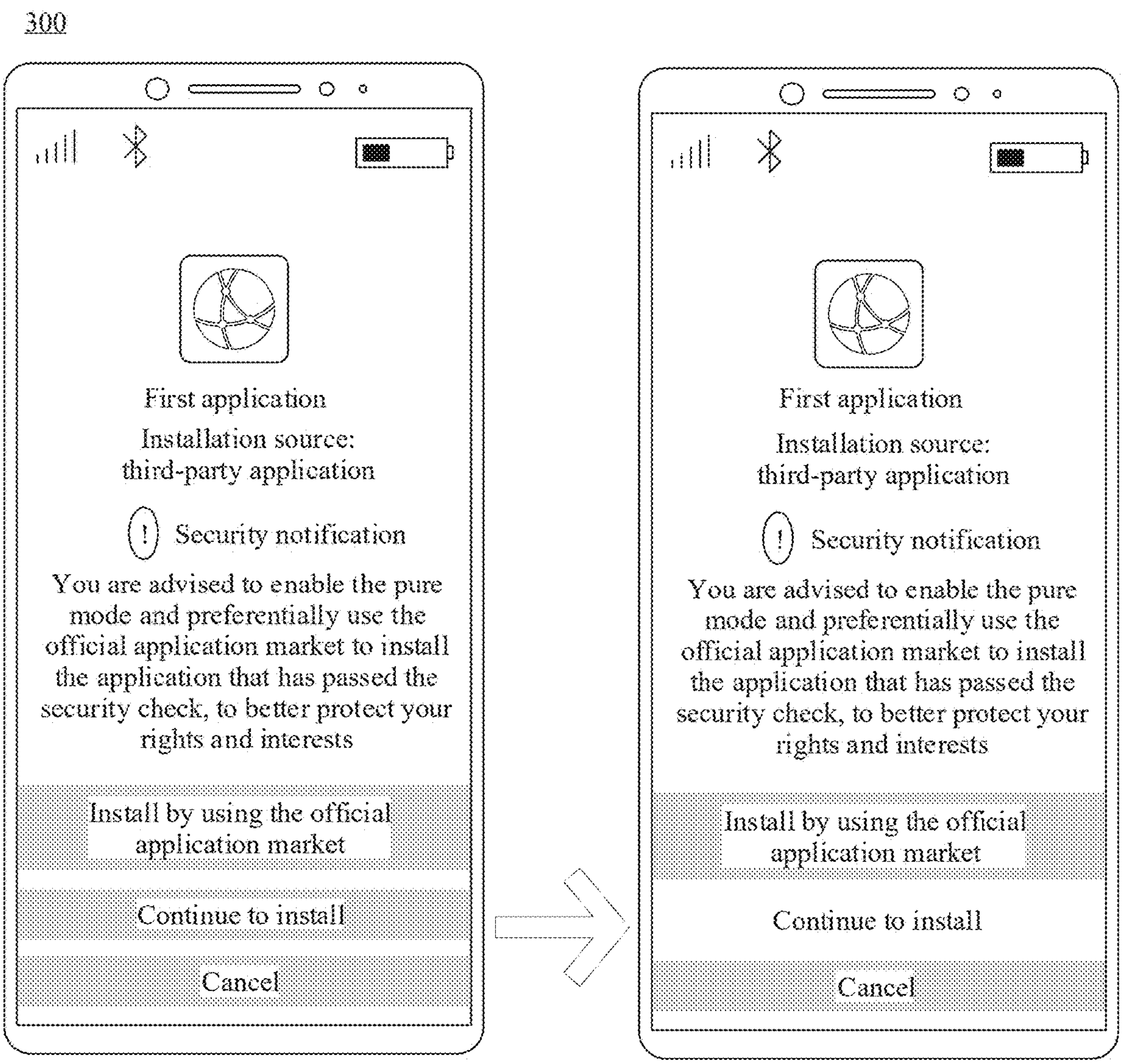
FIG. 3 is a schematic diagram in which a third-party application bypasses a risk prompt.

Specifically, as shown on the left of FIG. 3, the official application market may provide the risk prompt by using a system pop-up, to prompt the user that the first application is risky.

S160: The third-party application market skips the risk prompt, and automatically installs the first application on the user equipment.

Specifically, as shown in FIG. 3, the third-party application market discovers a prompt page by using the accessibility mode, finds a "Continue to install" button on the prompt interface to trigger an event, incompliantly skips the prompt of the system pop-up and another installation page, and automatically installs the risky application on the user equipment.

Figure 4:
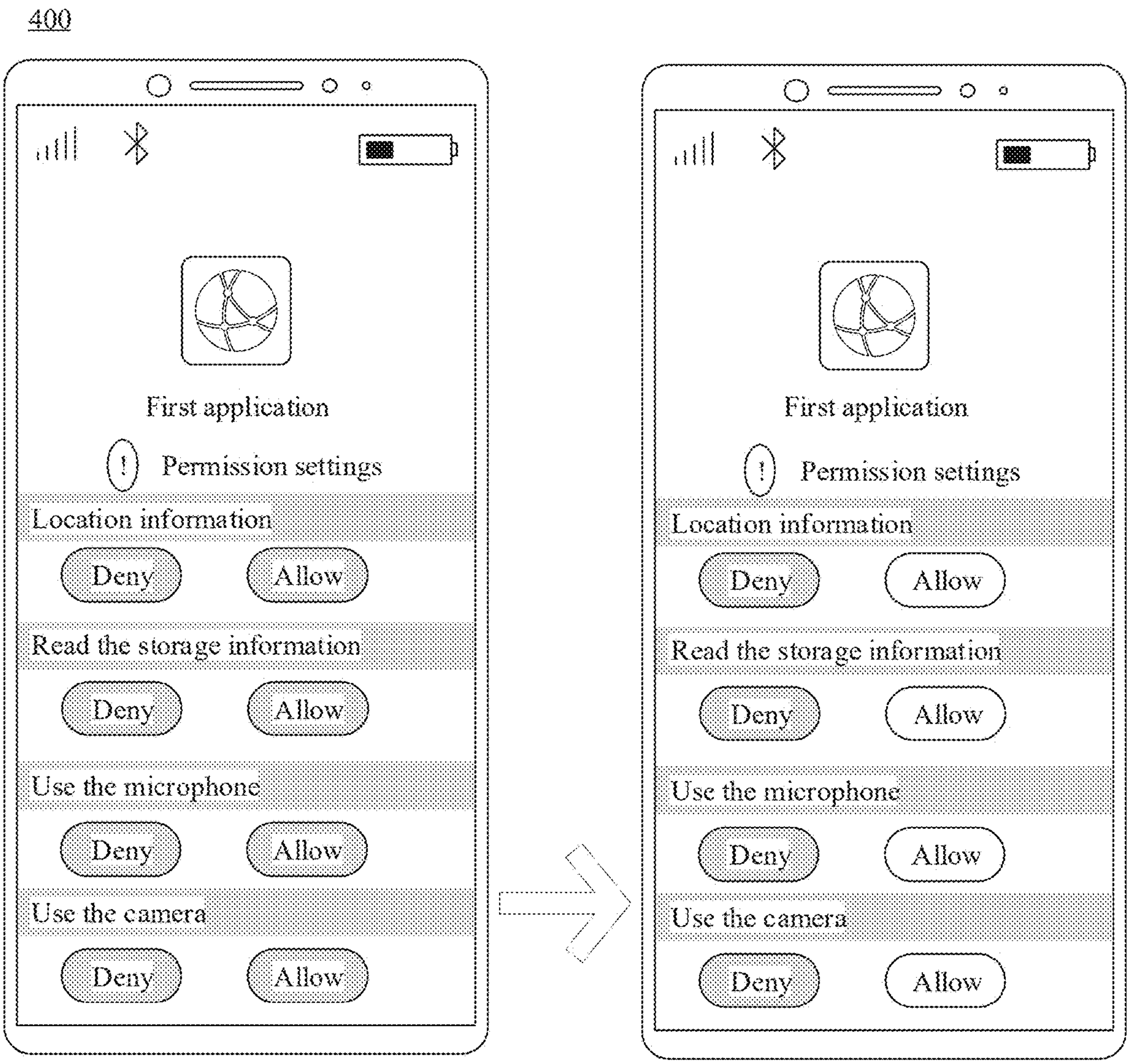
FIG. 4 is a schematic diagram in which a third-party application automatically performs authorization by using a device operation.

Optionally, as shown in FIG. 4, on a permission setting interface of the first application, the third-party application market or the first application discovers the permission setting interface by using the accessibility mode, finds an "Allow" button on the setting interface to trigger an event, incompliantly performs permission setting, and automatically authorizes the first application.

In the foregoing technology, because the A11Y capability provided by the system enables some third-party applications to use a normal function of the system to bypass a risk prompt popped up by the system, the user cannot perceive the risk and the risky application is installed. There are a huge risk and a security risk for a customer. In addition, these third-party applications may increase a downloading and installation quantity by exploiting the vulnerability, to affect installation and downloading of an application and advertisement revenue, affecting development of an ecosystem.

Based on the foregoing reasons, this application provides an application installation method, an apparatus, and an electronic device, so that a subsequent response policy can be determined by identifying a device operation on a current device, to prevent a third-party application from bypassing, through invoking of a system capability, important information prompted to a user, help a system better intercept a risk and provide a risk prompt, and improve user security.

Figure 5:
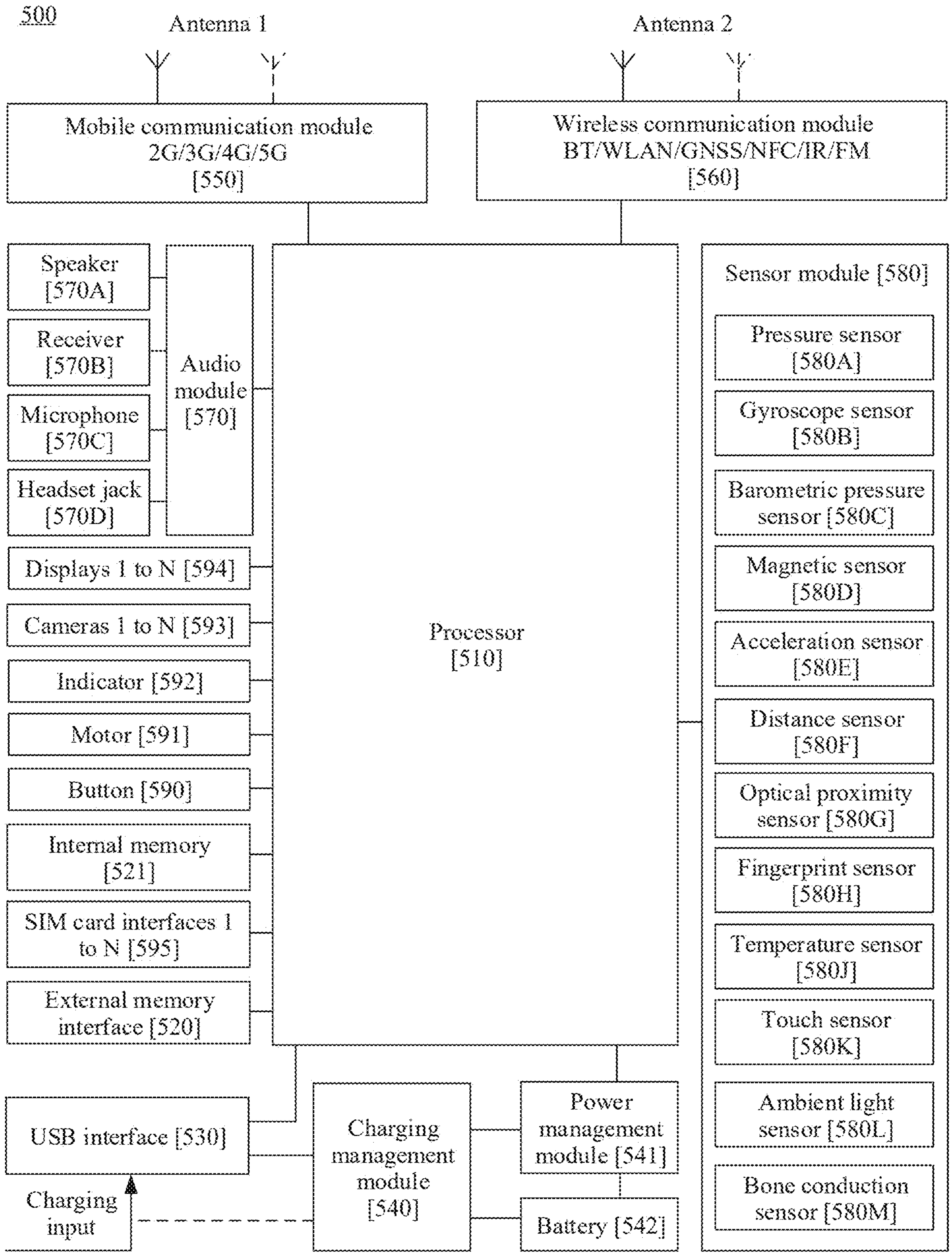
FIG. 5 is a schematic diagram of a hardware structure of an electronic device according to an embodiment of this application.

FIG. 5 is a schematic diagram of a hardware structure of an electronic device according to an embodiment of this application. The electronic device 500 shown in FIG. 5 is merely an example, and the electronic device 500 may have more or fewer components than those shown in the figure, may combine two or more components, or may have different component configurations. Various components shown in the figure may be implemented by using hardware including one or more signal processors and/or application-specific integrated circuits, software, or a combination of hardware and software.

The electronic device 500 may include: a processor 510, an external memory interface 520, an internal memory 521, a universal serial bus (universal serial bus, USB) interface 530, a charging management module 540, a power management module 541, a battery 542, an antenna 1, an antenna 2, a mobile communication module 550, a wireless communication module 560, an audio module 570, a speaker 570A, a receiver 570B, a microphone 570C, a headset jack 570D, a sensor module 580, a button 590, a motor 591, an indicator 592, a camera 593, a display 594, a subscriber identity module (subscriber identity module, SIM) card interface 595, and the like. The sensor module 580 may include a pressure sensor 580A, a gyroscope sensor 580B, a barometric pressure sensor 580C, a magnetic sensor 580D, an acceleration sensor 580E, a distance sensor 580F, an optical proximity sensor 580G, a fingerprint sensor 580H, a temperature sensor 580J, a touch sensor 580K, an ambient light sensor 580L, a bone conduction sensor 580M, and the like.

The processor 510 may include one or more processing units. For example, the processor 510 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. In some embodiments, the electronic device 500 may include one or more processors 510. The controller may generate an operation control signal based on an instruction operation code and a time sequence signal, to complete control of instruction reading and instruction execution. In some other embodiments, a memory may be disposed in the processor 510, and is configured to store instructions and data. For example, the memory in the processor 510 may be a cache. The memory may store instructions or data that has been recently used or cyclically used by the processor 510. If the processor 510 needs to use the instructions or the data again, the instructions or the data may be directly invoked from the memory. This avoids repeated access and reduces a waiting time of the processor 510, thereby improving data processing or instruction execution efficiency of the electronic device 500.

In some embodiments, the processor 510 may include one or more interfaces. The interface may include an inter-integrated circuit (inter-integrated circuit, 12C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB interface, and/or the like. The USB interface is an interface that conforms to a USB standard specification, and may be specifically a mini USB interface, a micro USB interface, a USB Type C interface, or the like. The USB interface may be configured to connect to a charger to charge the electronic device 500, or may be configured to exchange data between the electronic device 500 and a peripheral device. The USB interface may alternatively be configured to connect to a headset to play audio through the headset.

It may be understood that an interface connection relationship between the modules shown in this embodiment of this application is merely an example for description, and does not constitute a limitation on a structure of the electronic device 500. In some other embodiments of this application, the electronic device 500 may alternatively use an interface connection manner different from that in the foregoing embodiment, or use a combination of a plurality of interface connection manners.

A wireless communication function of the electronic device 500 may be implemented through the antenna 1, the antenna 2, the mobile communication module 550, the wireless communication module 560, the modem processor, the baseband processor, and the like.

The antenna 1 and the antenna 2 are configured to transmit and receive an electromagnetic wave signal. Each antenna in the electronic device 500 may be configured to cover one or more communication frequency bands. Different antennas may be further reused, to improve antenna utilization. For example, the antenna 1 may be reused as a diversity antenna in a wireless local area network. In some other embodiments, the antenna may be used in combination with a tuning switch.

The mobile communication module 550 may provide a solution, applied to the electronic device 500, to wireless communication including 2G, 3G, 4G, 5G, and the like. The mobile communication module 550 may include at least one filter, a switch, a power amplifier, a low noise amplifier (low noise amplifier, LNA), and the like. The mobile communication module 550 may receive an electromagnetic wave through the antenna 1, perform processing such as filtering or amplification on the received electromagnetic wave, and transmit the electromagnetic wave to the modem processor for demodulation. The mobile communication module 550 may further amplify a signal modulated by the modem processor, and convert the signal into an electromagnetic wave for radiation through the antenna 1. In some embodiments, at least some functional modules of the mobile communication module 550 may be disposed in the processor 510. In some embodiments, at least some functional modules of the mobile communication module 550 may be disposed in a same device as at least some modules of the processor 510.

The wireless communication module 560 may provide a solution, applied to the electronic device 500, to wireless communication including a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communication module 560 may be one or more devices integrating at least one communication processing module. The wireless communication module 560 receives the electromagnetic wave through the antenna 2, performs frequency modulation and filtering processing on the electromagnetic wave signal, and sends the processed signal to the processor 510. The wireless communication module 560 may further receive a to-be-sent signal from the processor 510, perform frequency modulation and amplification on the signal, and convert the signal into an electromagnetic wave for radiation through the antenna 2.

The electronic device 500 implements a display function by using the GPU, the display 594, the application processor, and the like. The GPU is a microprocessor for image processing, and is connected to the display 594 and the application processor. The GPU is configured to: perform mathematical and geometric computation and render an image. The processor 510 may include one or more GPUs that execute program instructions to generate or change display information.

The display 594 is configured to display an image, a video, and the like. The display 594 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 500 may include one or N displays 594, where N is a positive integer greater than 1.

The electronic device 500 may implement a photographing function by using the ISP, the camera 593, the video codec, the GPU, the display 594, the application processor, and the like. The camera 593 is configured to capture a static image or a video. An optical image of an object is generated through a lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as an RGB format or a YUV format. In some embodiments, the electronic device 500 may include one or N cameras 593, where N is a positive integer greater than 1.

The speaker 570A, also referred to as a "loudspeaker", is configured to convert an audio electrical signal into a sound signal. The electronic device 500 may listen to music or answer a hands-free call by using the speaker 570A.

The microphone 570C, also referred to as a "mike" or a "mic", is configured to convert a sound signal into an electrical signal. When making a call or sending voice information, a user may make a sound near the microphone 570C through the user's mouth, to input a sound signal to the microphone 570C. At least one microphone 570C may be disposed in the electronic device 500. In some other embodiments, two microphones 570C may be disposed in the electronic device 500, to collect a sound signal and further implement a noise reduction function. In some other embodiments, three, four, or more microphones 570C may alternatively be disposed in the electronic device 500, to collect a sound signal, reduce noise, further identify a sound source, implement a directional recording function, and the like.

In some embodiments, the electronic device may be a portable electronic device that further includes other functions such as a personal digital assistant function and/or a music player function, for example, a mobile phone, a tablet computer, a wearable electronic device having a wireless communication function (for example, a smartwatch), a video player, a headset, a sound box, or a camera. An example embodiment of the portable electronic device includes but is not limited to a portable electronic device using iOS®, Android®, Microsoft®, or another operating system. The portable electronic device may alternatively be another portable electronic device, such as a laptop computer (Laptop). It should be further understood that, in some other embodiments, the foregoing electronic device may not be a portable electronic device but a desktop computer, a television, a sound box, a camera, or the like.

Figure 6:
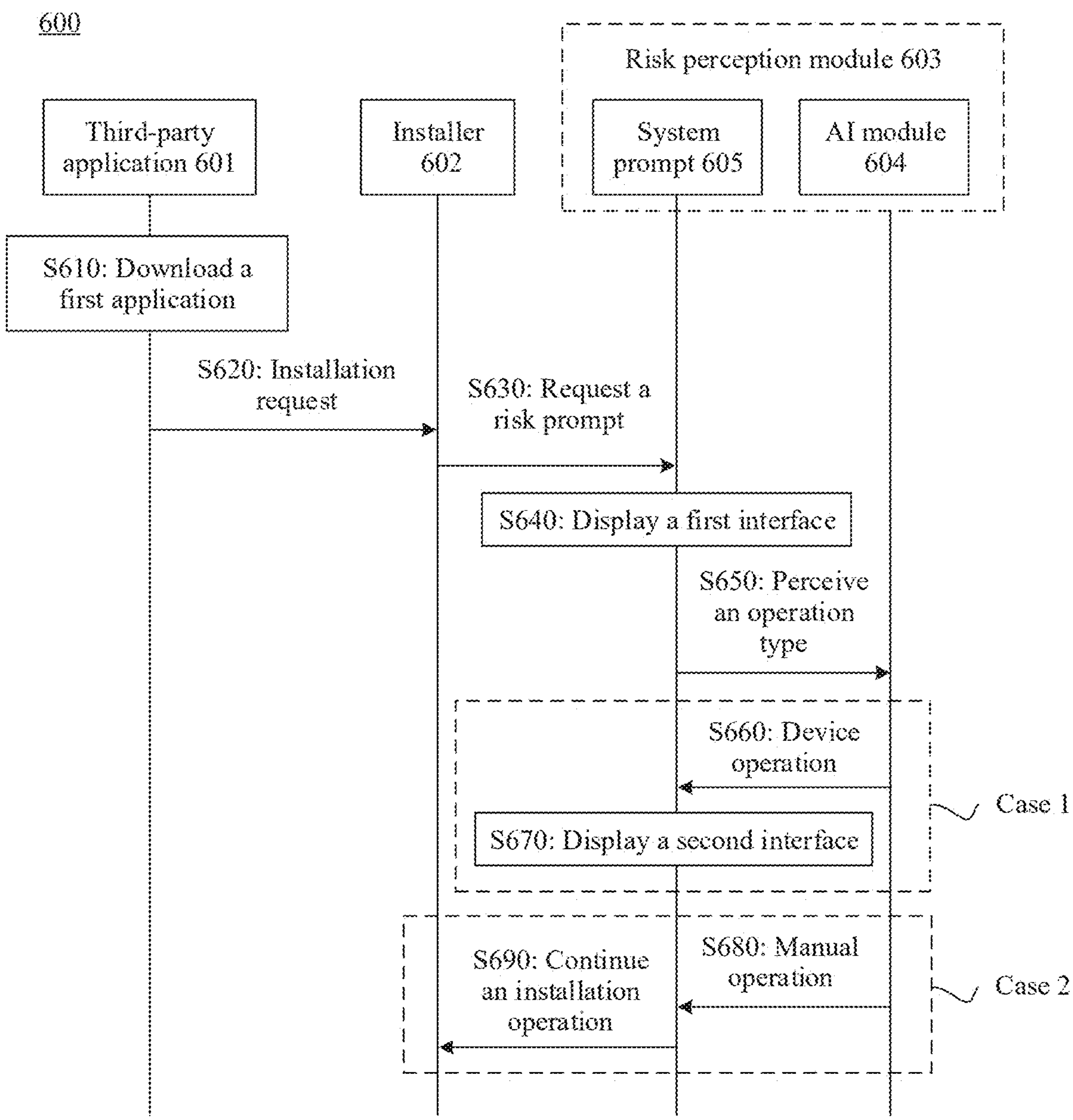
FIG. 6 is a schematic system flowchart of an application installation method according to an embodiment of this application.

FIG. 6 shows a system architecture to which an application installation method according to an embodiment of this application is applicable. As shown in FIG. 6, the application installation method provided in embodiments of this application may be applied to an electronic device 600. The electronic device 600 can support running of a third-party application 601, and specifically includes an installer 602 and a risk perception module 603. The risk perception module 603 includes an artificial intelligence (artificial intelligence, AI) module 604 and a system prompt module 605. In this embodiment, when the system installer 602 finds that the third-party application 601 starts the system installer 602, the system installer 602 requests the system prompt module 605 to prompt a consumer with a security risk, and the AI module 604 determines a subsequent policy by determining whether a corresponding operation performed on a prompt box is a device operation. If the operation is a device operation, a user is prompted with the risk by displaying a second interface. If it is found that the operation is a manual operation, a response is made according to original logic, to prevent a risky application from being automatically installed, which harms the user's rights and interests. Specifically, the following steps may be included.

S610: The third-party application downloads a first application.

The third-party application 601 may also be referred to as a third-party (risky) application. The third-party application may be a third-party application market or a third-party browser. In this application, a third party may be a software provider different from a terminal manufacturer, or may be a software provider the same as the terminal manufacturer.

Optionally, the third-party (risky) application requires or guides, by using an inducement or a pop-up prompt, the user to enable an accessibility mode (including but not limited to easy installation, one-tap installation, and the like) of a system of the electronic device 600, so that the third-party (risky) application has a capability of automatically operating a system interface of the electronic device 600, for example, an installation capability, a payment capability, a positioning capability, and a recording capability.

S620: The third-party application sends an installation request to the installer.

Specifically, the third-party application 601 may send an installation request to the installer 602. The installation request means that the third-party application 601 initiates an event response to a special page in a purposeful and targeted manner, to trigger control of a system prompt, so that the prompt is quickly skipped, and the user even cannot perceive and respond to the prompt, thereby achieving effect of bypassing.

S630: The installer requests the system prompt module to provide a risk prompt.

Specifically, the installer 602 perceives that an untrusted application (for example, the third-party application 601) attempts to invoke the system installer 602 to install the first application, which poses a corresponding security risk. In this case, the system requests the risk perception module 603 to provide the risk prompt. The installer 602 may detect whether the first application is an application that is not officially certified, a non-whitelisted application, or a blacklisted application.

Optionally, the foregoing detection process may be sequential. For example, the installer 602 may first detect whether the first application is an officially certified application, and/or then detect whether the first application is a whitelisted application, and/or then detect whether the first application is a blacklisted application.

S640: The system prompt module displays a first interface.

Specifically, as shown on the left of FIG. 3, the system prompt module 605 may provide a risk prompt by using a system pop-up, to prompt the user that the first application is risky.

S650: The AI module perceives an operation type.

Specifically, the AI module 604 may start to collect an operation performed on the first interface, for example, a second operation. The collecting an operation performed on the first interface includes collecting a feature of the second operation performed on the first interface. The feature of the second operation includes but is not limited to at least one of the following: a response time of the second operation, a pressing parameter of the second operation, or fingerprint information related to the second operation.

Case 1:

S660: The AI module determines that the second operation is a device operation.

Specifically, the AI module 604 may determine, based on the feature of the second operation collected in S650, that the second operation is a device operation.

S670: The system prompt module displays the second interface.

The second interface is used to prompt the user with an installation risk. For example, the second interface may be shown in a schematic interface diagram in FIG. 8. In the left part of the schematic interface diagram in FIG. 8, "A risk of a device operation automatically skipping the installation prompt interface is detected!" is used to prompt the user that there is a risk of a device operation, or briefly referred to as an installation risk, for the first device.

Case 2:

S680: The AI module determines that the second operation is a manual operation.

Specifically, the AI module 604 may determine, based on the feature of the second operation collected in S650, that the second operation is a manual operation.

S690: The installer continues an installation operation.

According to the technical solutions of this application, the AI module perceives a response operation, to obtain whether the response to the prompt box is manually operated by the user or is automatically triggered by a program, so as to perform different response actions, thereby preventing the third-party application from bypassing, through invoking of a system capability, important information prompted to the user, which affects user security.

Figure 7:
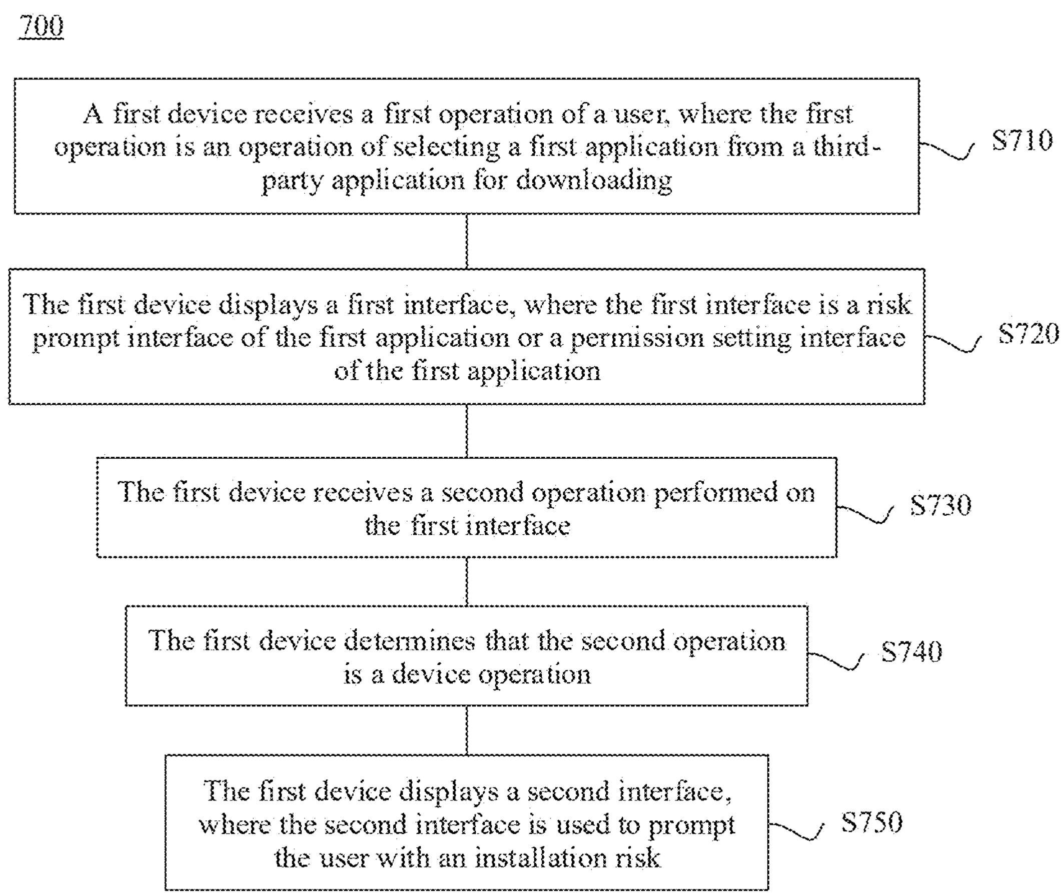
FIG. 7 is a schematic flowchart of an application installation method according to an embodiment of this application.

FIG. 7 is a schematic flowchart of an example of an application installation method according to an embodiment of this application.

S710: A first device receives a first operation of a user, where the first operation is an operation of selecting a first application from a third-party application for downloading.

The third-party application may be a third-party application market or a third-party browser. In this application, a third party may be a software provider different from a terminal manufacturer, or may be a software provider the same as the terminal manufacturer.

S720: The first device displays a first interface, where the first interface is a risk prompt interface of the first application or a permission setting interface of the first application.

Specifically, the first device may generate the first interface in response to the first operation of the user. For example, after S710 is performed, the first device further determines that the first application is a blacklisted application, a non-whitelisted application, or an application that is not officially certified, so that the first device displays the first interface, where the first interface is the risk prompt interface of the first application or a permission device interface of the first application. The whitelisted application may be an application authorized and trusted by a system, and a blacklist may be an application that is considered to be risky by the system. Detecting whether the first application is an officially certified application may be explained as: detecting whether a source of the first application is an official application market, or whether a download address of the first application is an official website address.

Optionally, the foregoing detection process may be sequential. For example, the first device may first detect whether the first application is an officially certified application, and/or then detect whether the first application is a whitelisted application, and/or then detect whether the first application is a blacklisted application.

The first interface may be an interface generated after the system of the first device performs detection on the first application. For example, when the first interface is the risk prompt interface of the first application, the first interface may be an interaction interface shown on the left of FIG. 3. For another example, when the first interface is the permission device interface of the first application, the first interface may be an interaction interface shown on the left of FIG. 4. The permission setting interface of the first application includes at least one of the following: permission to obtain location information of the first device; permission to read storage information of the first device; permission to write storage information of the first device; permission to use a microphone of the first device; permission to use a camera of the first device; or permission to allow the first application to be displayed in a floating window on the first device.

S730: The first device receives a second operation performed on the first interface.

Specifically, after displaying the first interface, the first device may start to collect an operation performed on the first interface, for example, the second operation. The collecting an operation performed on the first interface includes collecting a feature of the second operation performed on the first interface.

S740: The first device determines that the second operation is a device operation.

Specifically, the first device may determine, based on the feature of the second operation collected in S710, whether the second operation is a device operation. The feature of the second operation includes but is not limited to at least one of the following: a response time of the second operation, a pressing parameter of the second operation, or fingerprint information related to the second operation. For example, the feature of the second operation may include: a response time between display of the first interface and the second operation performed on the first interface; a press generated on a touchscreen of the first device by the second operation; a fingerprint generated on the touchscreen of the first device by the second operation; a press generated on a physical button of the first device by the second operation; or a fingerprint generated on the physical button of the first device by the second operation. In this way, the device may perform comprehensive determining based on the feature of the second operation, to identify whether the second operation is a device operation, thereby helping better intercept a risk and provide a risk prompt, and improving user security.

S750: The first device displays a second interface, where the second interface is used to prompt the user with an installation risk.

Figure 8:
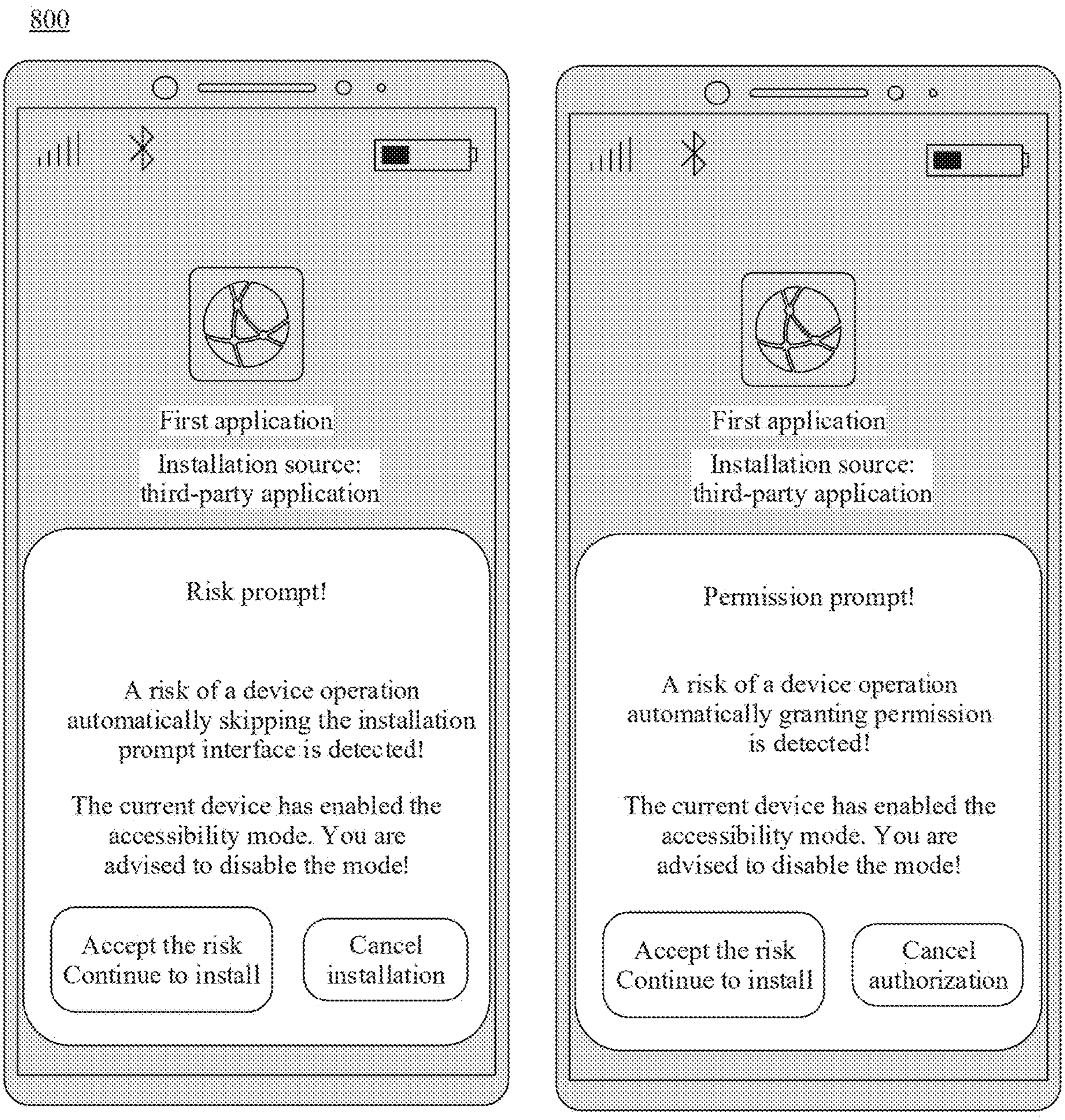
FIG. 8 is a schematic diagram of a second interface according to an embodiment of this application.

The second interface is an interface generated after the system of the first device detects the first application, for example, an interaction interface shown in FIG. 8. In the left part of the schematic interface diagram in FIG. 8, "A risk of a device operation automatically skipping the installation prompt interface is detected!" is used to prompt the user that there is a risk of a device operation, or briefly referred to as an installation risk, for the first device. In the right part of the schematic interface diagram in FIG. 8, "A risk of a device operation automatically granting permission is detected!" is used to prompt the user that there is a risk of a device operation, or briefly referred to as an installation risk, for the first device, or may specifically prompt the user that there is a risk of application authorization for the first device.

Optionally, before the first device displays the second interface, the first device may further receive a third operation of the user, where the third operation indicates the first device to enable an accessibility mode, and the second interface is further used to prompt the user that the first device has enabled the accessibility mode. For example, in the two schematic diagrams in FIG. 8, "The current device has enabled the accessibility mode" is used to prompt the user that the first device has enabled the accessibility mode. In this way, after the user performs the third operation under guidance or without being informed, to enable the accessibility mode by mistake, the device may prompt, by using the second interface, the user that the first device has enabled the accessibility mode. This helps better intercept a risk and provide a risk prompt, and improves user security.

Optionally, when it is determined that the first operation is a manual operation (that is, a non-device operation), the first device may further receive a fourth operation of the user, where the fourth operation is used to request an installation of a second application. The first device displays a third interface, where the third interface is a risk prompt interface of a third application or a permission setting interface of the third application. The first device receives a fifth operation performed on the third interface. The first device determines that the fifth operation is a manual operation (that is, a non-device operation). The first device continues to install the second application.

According to the technical solutions of this application, a subsequent response policy can be determined by identifying a device operation on a current device, to prevent the third-party application from by passing, through invoking of a system capability, important information prompted to the user, help a system better intercept a risk and provide a risk prompt, and improve user security.

Figure 9:
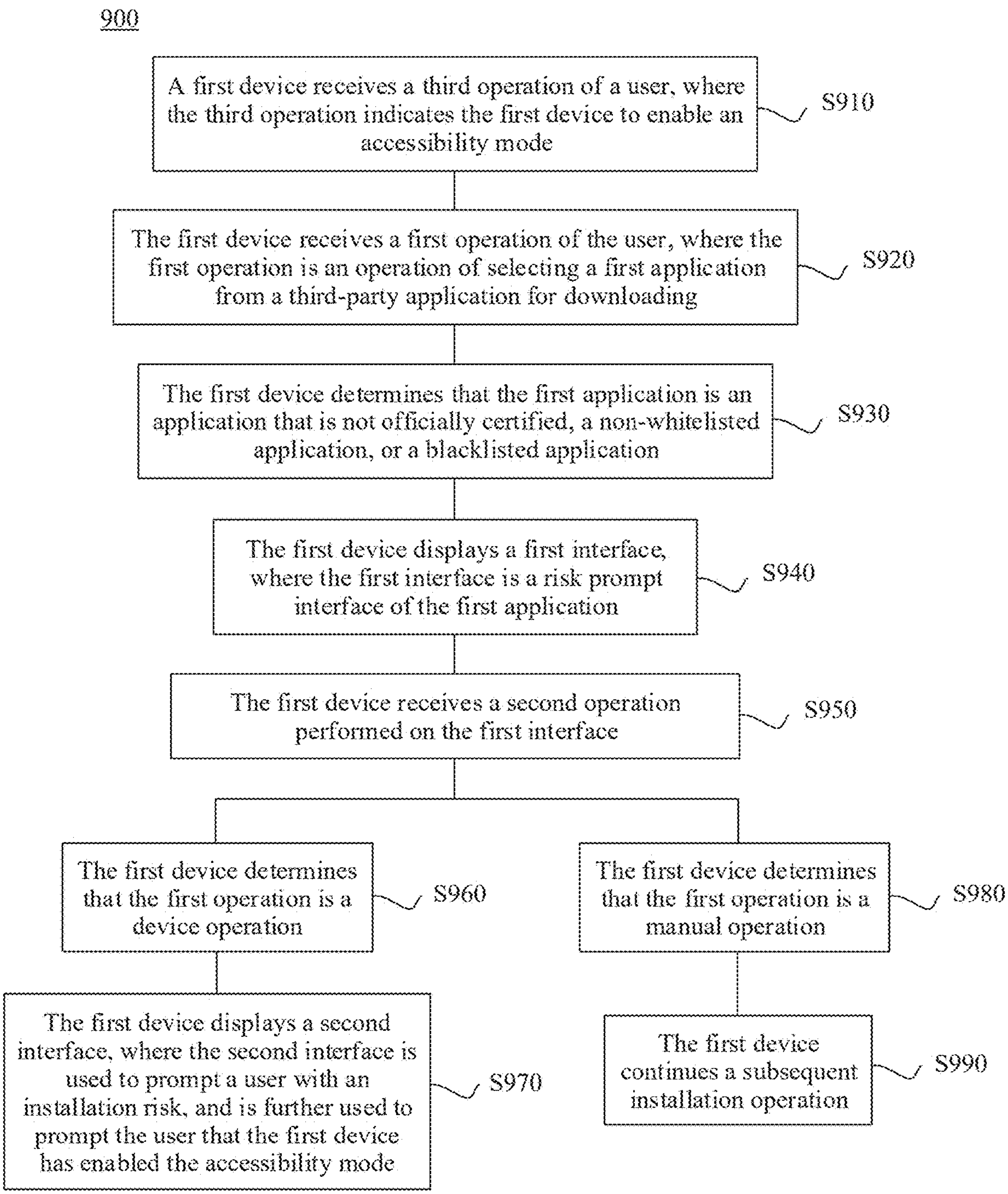
FIG. 9 is a schematic flowchart of a specific example of an application installation method according to an embodiment of this application.

FIG. 9 is a schematic flowchart of a specific example of an application installation method according to an embodiment of this application. In this embodiment, a first interface is specifically an installation risk prompt interface of a first device. The first device may collect a second operation performed on the installation risk prompt interface. When it is determined that the second operation is a device operation, the first device generates a second interface to remind a user that there is an installation risk (a risk of a device operation) for the first device.

S910: The first device receives a third operation of a user, where the third operation indicates the first device to enable an accessibility mode.

Specifically, the user performs the third operation without being informed or under guidance or as prompted by a third-party application (including but not limited to a third-party application market), to enable the accessibility mode (for example, easy installation or a one-tap installation function) of the first device. An interface interaction diagram thereof may be shown in FIG. 2. In FIG. 2, "Enabled" indicates that the first device has enabled the accessibility mode.

S920: The first device receives a first operation of the user, where the first operation is an operation of selecting a first application from the third-party application for downloading.

Specifically, the first device performs the first operation of the user, and downloads the first application in the third-party application (including but not limited to the third-party application market). After the first application is downloaded, the third-party application may start an installation procedure based on the operation of the user, and may request the first device to install the first application. The third-party application may be the third-party application market or a third-party browser. In this application, a third party may be a software provider different from a terminal manufacturer, or may be a software provider the same as the terminal manufacturer.

S930: The first device determines that the first application is an application that is not officially certified, a non-whitelisted application, or a blacklisted application.

Specifically, the first device may check whether the first application is an application that is not officially certified, a non-whitelisted application, or a blacklisted application. When the first application is at least one of the foregoing three applications, S940 may be performed.

Optionally, before checking the first application, the first device may further check whether an application initiator (that is, the third-party application) is an authorized or trusted application or component, that is, determine whether the third-party application is an application that is not officially certified.

S940: The first device displays the first interface, where the first interface is a risk prompt interface of the first application.

Specifically, when it is determined that the first application is at least one of an application that is not officially certified, a non-whitelisted application, or a blacklisted application, the first device may generate the first interface to prompt the user with an installation risk. The first interface may be specifically the installation risk prompt interface of the first device, that is, an installation risk prompt interface provided by a system of the first device, for example, an interaction interface shown on the left of FIG. 3.

S950: The first device receives the second operation performed on the first interface.

Specifically, after displaying the first interface, the first device may start to collect an operation performed on the first interface, for example, the second operation. The collecting an operation performed on the first interface includes collecting a feature of the operation performed on the first interface.

S960: The first device determines whether the first operation is a device operation.

Specifically, the first device may determine, based on the feature of the second operation collected in S950, whether the second operation is a device operation. The feature of the second operation includes but is not limited to at least one of the following: a response time of the second operation, a pressing parameter of the second operation, or fingerprint information related to the second operation. For example, the feature of the second operation may include: a response time between display of the first interface and the second operation performed on the first interface; whether the second operation generates a press on a touchscreen of the first device; whether the second operation generates a fingerprint on the touchscreen of the first device; whether the second operation generates a press on a physical button of the first device; or whether the second operation generates a fingerprint on the physical button of the first device. In this way, the device may perform comprehensive determining based on the feature of the second operation, to identify whether the second operation is a device operation, thereby helping better intercept a risk and provide a risk prompt, and improving user security.

S970: When it is determined that the first operation is a device operation, the first device displays the second interface, where the second interface is used to prompt the user with a risk, and is further used to prompt the user that the first device has enabled the accessibility mode.

Specifically, after determining that the first operation is a device operation, the first device may display the second interface, to prompt the user that there is a risk of a device operation for the first device. For example, "A risk of a device operation automatically skipping the installation prompt interface is detected!" shown on the left interface of FIG. 8 is used to prompt the user that there is a risk of a device operation in the first device.

Optionally, the second interface may further prompt the user that the first device has enabled the accessibility mode. For example, "The current device has enabled the accessibility mode" shown on the left interface of FIG. 8 is used to prompt the user that the first device has enabled the accessibility mode. In this way, after the user performs the second operation under guidance or without being informed, to enable the accessibility mode by mistake, the device may prompt, by using the second interface, the user that the first device has enabled the accessibility mode. This helps better intercept a risk and provide a risk prompt, and improves user security.

S980: The first device determines that the second operation is a manual operation.

Specifically, the first device may determine, based on the feature of the second operation collected in S950, that the second operation is a manual operation (that is, a non-device operation). The feature of the second operation includes but is not limited to at least one of the following: a response time of the second operation, a pressing parameter of the second operation, or fingerprint information related to the second operation. For example, the feature of the second operation may include: a response time between display of the first interface and the second operation performed on the first interface; whether the second operation generates a press on a touchscreen of the first device; whether the second operation generates a fingerprint on the touchscreen of the first device; whether the second operation generates a press on a physical button of the first device; or whether the second operation generates a fingerprint on the physical button of the first device. In this way, the device may perform comprehensive determining based on the feature of the second operation, to identify whether the second operation is a manual operation, thereby helping better intercept a risk and provide a risk prompt, and improving user security.

S990: The first device continues a subsequent installation operation.

Specifically, after determining that the first operation is a manual operation, the first device may continue the subsequent installation operation based on a current technology. For example, a corresponding action is performed or a corresponding interface is displayed based on the second operation.

It should be understood that the foregoing descriptions are given by using an example in which the first device determines whether the second operation is a device operation. When determining that the second operation is a device operation, the first device may display the second interface to prompt the user with an installation risk. When determining that the second operation is a manual operation, the first device may perform the second operation, and continue the subsequent installation operation.

It should be further understood that, although not shown in the figure, the first device may further receive a fourth operation of the user. The fourth operation is an operation of selecting a second application from the third-party application for downloading, that is, the fourth operation is used to request an installation of the second application. Similar to the foregoing process, the first device may display a third interface, where the third interface is a risk prompt interface of the second application or a permission setting interface of the second application. The first device receives a fifth operation performed on the third interface, and determines that the fifth operation is a manual operation (that is, a non-device operation). The first device continues the second application. For a process of determining that the fifth operation is a manual operation, refer to the foregoing process of determining that the second operation is a manual operation. Details are not described herein again.

According to the technical solutions of this application, a subsequent response policy can be determined by identifying a device operation on an installation risk prompt interface of the device, to prevent the third-party application from bypassing, through invoking of a system capability, important information prompted to the user, help a system better intercept a risk and provide a risk prompt, and improve user security.

Figure 10:
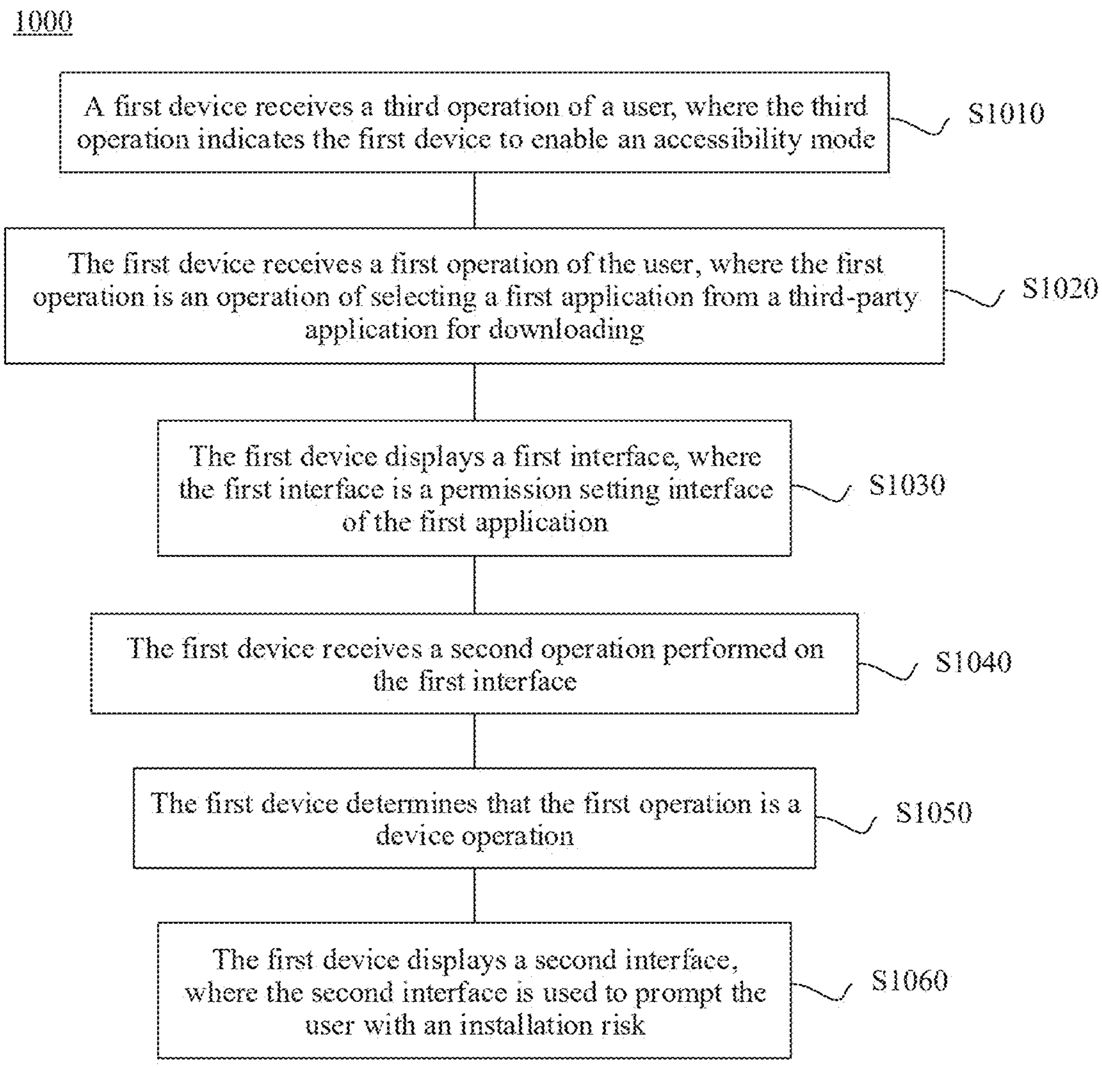
FIG. 10 is a schematic flowchart of another specific example of an application installation method according to an embodiment of this application.

FIG. 10 is a schematic flowchart of another specific example of an application installation method according to an embodiment of this application. In this embodiment, a first interface is specifically a permission setting interface of a first application. A first device may collect a second operation performed on the first interface. Provided that it is determined that the second operation is a device operation, the first device generates a second interface to prompt a user that there is an installation risk (a risk of a device operation) for the first device, and may further prompt the user that the first device has enabled an accessibility mode.

S1010: The first device receives a third operation of the user, where the third operation indicates the first device to enable the accessibility mode.

S1020: The first device receives a first operation of the user, where the first operation is an operation of selecting the first application from a third-party application for downloading.

For S1010 and S1020, refer to S910 and S920 in FIG. 9. For brevity, details are not described herein again.

S1030: The first device displays the first interface, where the first interface is the permission setting interface of the first application.

Specifically, in a process of installing the first application, the first application may request application permission from the first device, so that the first device may display the first interface. The first interface is a risk prompt interface of the first application or the permission setting interface of the first application. The first interface may be specifically the application permission setting interface of the first device, for example, an interaction interface shown on the left of FIG. 4. As an example rather than a limitation, the interface includes at least one of the following: permission to obtain location information of the first device; permission to read storage information of the first device; permission to write storage information of the first device; permission to use a microphone of the first device; permission to use a camera of the first device; or permission to allow the first application to be displayed in a floating window on the first device.

S1040: The first device receives the second operation performed on the first interface.

Specifically, after displaying the first interface, the first device may start to collect an operation performed on the first interface, for example, the second operation. The collecting an operation performed on the first interface includes collecting a feature of the second operation performed on the first interface.

S1050: The first device determines that the first operation is a device operation.

Specifically, the first device may determine, based on the feature of the second operation collected in S1040, whether the second operation is a device operation. The feature of the second operation includes but is not limited to at least one of the following: a response time of the second operation, a pressing parameter of the second operation, or fingerprint information related to the second operation. For example, the feature of the second operation may include: a response time between display of the first interface and the second operation performed on the first interface; a press generated on a touchscreen of the first device by the second operation; a fingerprint generated on the touchscreen of the first device by the second operation; a press generated on a physical button of the first device by the second operation; or a fingerprint generated on the physical button of the first device by the second operation. In this way, the device may perform comprehensive determining based on the feature of the second operation, to identify whether the second operation is a device operation, thereby helping better intercept a risk and provide a risk prompt, and improving user security.

S1060: The first device displays the second interface, where the second interface is used to prompt the user with an installation risk.

Specifically, after determining that the first operation is a device operation, the first device may display the second interface to install the application for the user. For example, in the right part of the schematic interface diagram in FIG. 8, "A risk of a device operation automatically granting permission is detected!" is used to prompt the user that there is a risk of a device operation, or briefly referred to as an installation risk, for the first device, or may specifically prompt the user that there is a risk of application authorization for the first device.

Optionally, the second interface may further prompt the user that the first device has enabled the accessibility mode. For example, "The current device has enabled the accessibility mode" shown on the right interface of FIG. 8 is used to prompt the user that the first device has enabled the accessibility mode. In this way, after the user performs the second operation under guidance or without being informed, to enable the accessibility mode by mistake, the device may prompt, by using the second interface, the user that the first device has enabled the accessibility mode. This helps better intercept a risk and provide a risk prompt, and improves user security.

Optionally, when it is determined that the second operation is a manual operation (that is, a non-device operation), the first device performs a corresponding operation. For example, the first device grants corresponding permission to the first application based on a corresponding action performed by the second operation.

According to the technical solutions of this application, a subsequent response policy is determined by identifying a device operation on an application permission setting interface of a current device, to prevent the third-party application from granting additional permission to an application by bypassing, through invoking of a system capability, important information prompted by the user, thereby helping a system better intercept a risk and provide a risk prompt, and improving user security.

It should be understood that sequence numbers of the foregoing processes do not mean execution sequences. The execution sequences of the processes should be determined based on functions and internal logic of the processes, and should not constitute any limitation on the implementation processes of embodiments of this application.

It should be further understood that in embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that, in the foregoing embodiments of this application, the methods implemented by a device may alternatively be implemented by a component (for example, a chip or a circuit) that can be configured inside the device.

Figure 11:
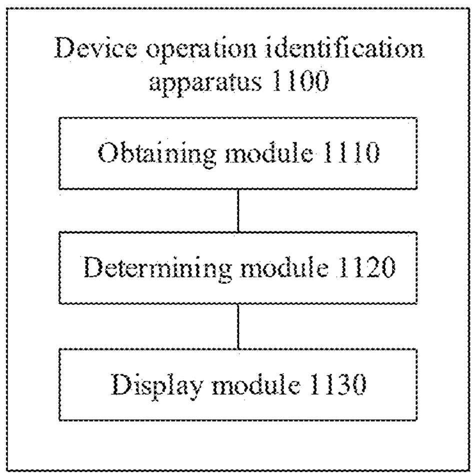
FIG. 11 is a schematic diagram of a structure of an example of an application installation device according to an embodiment of this application.

FIG. 11 is a schematic diagram of a structure of an example of an application installation apparatus according to an embodiment of this application. It should be understood that descriptions of apparatus embodiments correspond to the descriptions of the method embodiments. Therefore, for content that is not described in detail, refer to the foregoing method embodiments. For brevity, a part of content is not described again.

In embodiments of this application, the first device may be divided into functional modules based on the foregoing method examples. For example, each functional module corresponding to each function may be obtained through division, or two or more functions may be integrated into one processing module. The integrated module may be implemented in a form of hardware, or may be implemented in a form of a software functional module. It should be noted that, in embodiments of this application, division into the modules is an example, and is merely logical function division. In actual implementation, another division manner may be used. An example in which each functional module is obtained through division based on each corresponding function is used below for description.

The first device related to any one of the method 700, the method 900, or the method 1000 may be implemented by the application installation apparatus shown in FIG. 11.

As shown in FIG. 11, an application installation apparatus 1100 includes an obtaining module 1110, a determining module 1120, and a display module 1130.

The obtaining module 1110 is configured to receive a first operation of a user, where the first operation is an operation of selecting a first application from a third-party application for downloading. The display module 1130 is configured to display a first interface, where the first interface is a risk prompt interface of the first application or a permission setting interface of the first application. The obtaining module 1110 is further configured to receive a second operation performed on the first interface. The determining module 1120 is configured to determine that the second operation is a device operation. The display module 1130 is configured to display a second interface, where the second interface is used to prompt the user with an installation risk.

Optionally, the determining module 1120 is specifically configured to determine, based on a feature of the second operation, that the second operation is a device operation, where the feature of the second operation includes at least one of the following: a response time of the second operation, a pressing parameter of the second operation, or fingerprint information related to the second operation.

Optionally, the obtaining module 1110 is further configured to receive a third operation of the user, where the third operation indicates the first device to enable an accessibility mode, and the second interface is further used to prompt the user that the first device has enabled the accessibility mode.

Optionally, before the display module 1130 displays the first interface, the determining module 1120 is further configured to determine that the first application is a blacklisted application, a non-whitelisted application, or an application that is not officially certified.

Optionally, the permission setting interface of the first application includes at least one of the following: permission to obtain location information of the first device; permission to read storage information of the first device; permission to write storage information of the first device; permission to use a microphone of the first device; permission to use a camera of the first device; or permission to allow the first application to be displayed in a floating window on the first device.

Optionally, the obtaining module 1110 is further configured to receive a fourth operation of the user, where the fourth operation is used to request an installation of a second application. The display module 1130 is further configured to display a third interface, where the third interface is a risk prompt interface of a third application or a permission setting interface of the third application. The obtaining module 1110 is further configured to receive a fifth operation performed on the third interface. The determining module 1120 is further configured to determine that the fifth operation is a manual operation (that is, a non-device operation). The display module 1130 is further configured to continue to install the second application.

In some embodiments, the display module 1130 may be the system prompt module 605 shown in FIG. 6, and the determining module 1120 may be the artificial intelligence AI module 604 and an installer 602 shown in FIG. 6.

Figure 12:
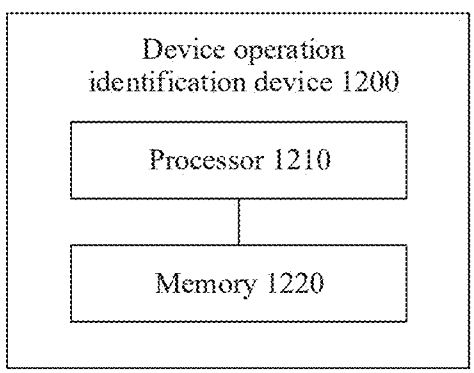
FIG. 12 is a schematic diagram of a structure of an example of an application installation apparatus according to an embodiment of this application.

FIG. 12 is a schematic framework diagram of an application installation device according to an embodiment of this application. As shown in FIG. 12, an electronic device 1200 may include one or more processors 1210 and one or more memories 1220. The one or more memories 1220 store one or more computer programs. The one or more computer programs include instructions. When the instructions are executed by the one or more processors, the display method according to any one of the foregoing possible implementations is performed.

An embodiment of this application further provides a chip. The chip includes a processor and a communication interface. The communication interface is configured to:

receive a signal, and transmit the signal to the processor. The processor processes the signal, so that the display method in any one of the foregoing possible implementations is performed.

It may be understood that, to implement the foregoing functions, the electronic device includes corresponding hardware and/or software modules for performing the functions. The example algorithm steps described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each specific application with reference to embodiments, but it should not be considered that the implementation goes beyond the scope of this application.

In this embodiment, the electronic device may be divided into functional modules based on the foregoing method examples. For example, each functional module corresponding to each function may be obtained through division, or two or more functions may be integrated into one processing module. The integrated module may be implemented in a form of hardware. It should be noted that module division in this embodiment is an example, and is merely logical function division. In actual implementation, another division manner may be used.

An embodiment further provides a computer-readable storage medium. The computer-readable storage medium stores computer instructions. When the computer instructions are run on an electronic device, the electronic device is enabled to perform the related method steps, to implement the display method in the foregoing embodiments.

An embodiment further provides a computer program product. When the computer program product runs on a computer, the computer is enabled to perform the foregoing related steps, to implement the display method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the display method in the foregoing method embodiments.

The electronic device, the computer-readable storage medium, the computer program product, or the chip provided in embodiments is configured to perform the corresponding method provided above. Therefore, for beneficial effects that can be achieved by the computer-readable storage medium, the computer program product, or the chip, refer to the beneficial effects in the corresponding methods provided above. Details are not described herein again.

A person of ordinary skill in the art may be aware that, example units and algorithm steps described with reference to embodiments disclosed in this specification may be implemented by electronic hardware, computer software, or a combination of computer software and electronic hardware. Whether the functions are performed by hardware or software depends on particular applications and design constraints of the technical solutions. A person skilled in the art may use different methods to implement the described functions for each specific application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one place, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (read-only memory. ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An application installation method, comprising:

receiving, by a first device, a first operation of a user, wherein the first operation is an operation of selecting a first application from a third-party application for downloading;

displaying, by the first device, a first interface, wherein the first interface is a risk prompt interface of the first application or a permission setting interface of the first application;

receiving, by the first device, a second operation performed on the first interface; and displaying, by the first device and based on the second operation being a device operation, a second interface different from the first interface, wherein the second interface is used to prompt the user with an installation risk.

2. The method according to claim 1, wherein the method further comprises:

determining, by the first device based on a feature of the second operation, that the second operation is the device operation, wherein the feature of the second operation comprises at least one of the following:

a response time of the second operation, a pressing parameter of the second operation, or fingerprint information related to the second operation.

3. The method according to claim 1, wherein before receiving, by the first device, the first operation of the user, the method further comprises:

receiving, by the first device, a third operation of the user, wherein the third operation indicates the first device to enable an accessibility mode.

4. The method according to claim 3, wherein the second interface is further used to prompt the user that the first device has enabled the accessibility mode.

5. The method according to claim 1, wherein before displaying, by the first device, the first interface, the method further comprises:

determining, by the first device, that the first application is an application that is not officially certified, a non-whitelisted application, or a blacklisted application.

6. The method according to claim 1, wherein the permission setting interface of the first application comprises at least one of the following:

permission to obtain location information of the first device;

permission to read storage information of the first device;

permission to write storage information of the first device;

permission to use a microphone of the first device;

permission to use a camera of the first device; or permission to allow the first application to be displayed in a floating window on the first device.

7. The method according to claim 1, wherein the method further comprises:

receiving, by the first device, a fourth operation of the user, wherein the fourth operation is an operation of selecting a second application from the third-party application for downloading;

displaying, by the first device, a third interface, wherein the third interface is a risk prompt interface of the second application or a permission setting interface of the second application;

receiving, by the first device, a fifth operation performed on the third interface;

determining, by the first device, that the fifth operation is a manual operation; and continuing, by the first device, to install the second application.

8. An electronic device, comprising one or more processors and one or more memories, wherein the one or more memories store one or more programming instructions for execution by the one or more processors to perform operations comprising:

receiving a first operation of a user, wherein the first operation is an operation of selecting a first application from a third-party application for downloading;

displaying a first interface, wherein the first interface is a risk prompt interface of the first application or a permission setting interface of the first application;

receiving a second operation performed on the first interface; and displaying, based on the second operation being a device operation, a second interface different from the first interface, wherein the second interface is used to prompt the user with an installation risk.

9. The electronic device according to claim 8, wherein the operations further comprise:

determining, based on a feature of the second operation, that the second operation is the device operation, wherein the feature of the second operation comprises at least one of the following:

a response time of the second operation, a pressing parameter of the second operation, or fingerprint information related to the second operation.

10. The electronic device according to claim 8, wherein before receiving the first operation of the user, the operations further comprise:

receiving a third operation of the user, wherein the third operation indicates the electronic device to enable an accessibility mode.

11. The electronic device according to claim 10, wherein the second interface is further used to prompt the user that the electronic device has enabled the accessibility mode.

12. The electronic device according to claim 8, wherein before displaying the first interface, the operations further comprise:

determining that the first application is an application that is not officially certified, a non-whitelisted application, or a blacklisted application.

13. The electronic device according to claim 8, wherein the permission setting interface of the first application comprises at least one of the following:

permission to obtain location information of the electronic device;

permission to read storage information of the electronic device;

permission to write storage information of the electronic device;

permission to use a microphone of the electronic device;

permission to use a camera of the electronic device; or permission to allow the first application to be displayed in a floating window on the electronic device.

14. The electronic device according to claim 8, wherein the operations further comprise:

receiving a fourth operation of the user, wherein the fourth operation is an operation of selecting a second application from the third-party application for downloading;

displaying a third interface, wherein the third interface is a risk prompt interface of the second application or a permission setting interface of the second application;

receiving a fifth operation performed on the third interface;

determining that the fifth operation is a manual operation; and continuing to install the second application.

15. A chip, wherein the chip comprises at least one processor and a communication interface receiving programming instructions, and wherein the at least one processor executes the programming instructions to perform operations comprising:

receiving, by a first device, a first operation of a user, wherein the first operation is an operation of selecting a first application from a third-party application for downloading;

displaying, by the first device, a first interface, wherein the first interface is a risk prompt interface of the first application or a permission setting interface of the first application;

receiving, by the first device, a second operation performed on the first interface; and displaying, by the first device and based on the second operation being a device operation, a second interface different from the first interface, wherein the second interface is used to prompt the user with an installation risk.

16. The chip according to claim 15, wherein the operations further comprise:

determining, by the first device based on a feature of the second operation, that the second operation is the device operation, wherein the feature of the second operation comprises at least one of the following:

a response time of the second operation, a pressing parameter of the second operation, or fingerprint information related to the second operation.

17. The chip according to claim 15, wherein before receiving, by the first device, the first operation of the user, the operations further comprise:

receiving, by the first device, a third operation of the user, wherein the third operation indicates the first device to enable an accessibility mode.

18. The chip according to claim 17, wherein the second interface is further used to prompt the user that the first device has enabled the accessibility mode.

19. The chip according to claim 15, wherein before displaying, by the first device, the first interface, the operations further comprise:

determining, by the first device, that the first application is an application that is not officially certified, a non-whitelisted application, or a blacklisted application.

20. The chip according to claim 15, wherein the permission setting interface of the first application comprises at least one of the following:

permission to obtain location information of the first device;

permission to read storage information of the first device;

permission to write storage information of the first device;

permission to use a microphone of the first device;

permission to use a camera of the first device; or permission to allow the first application to be displayed in a floating window on the first device.

* * * * *